United States Patent
Chuo et al.

(10) Patent No.: US 9,774,237 B2
(45) Date of Patent: Sep. 26, 2017

(54) SLIDE-BLOCK-TYPE SHAFT LINEAR MOTOR PLATFORM

(71) Applicant: HIWIN MIKROSYSTEM CORP., Taichung (TW)

(72) Inventors: Yung-Tsai Chuo, Taichung (TW); Yu-Jung Chang, Taichung (TW); Sheng-Shiun Huang, Taichung (TW)

(73) Assignee: HIWIN MIKROSYSTEM CORP., Taichung (TW)

( * ) Notice: Subject to any disclaimer, the term of this patent is extended or adjusted under 35 U.S.C. 154(b) by 302 days.

(21) Appl. No.: 14/640,017

(22) Filed: Mar. 5, 2015

(65) Prior Publication Data

US 2016/0261170 A1    Sep. 8, 2016

(51) Int. Cl.
*H02K 41/03*    (2006.01)
*H02K 9/04*    (2006.01)
*H02K 3/47*    (2006.01)

(52) U.S. Cl.
CPC ............ *H02K 41/031* (2013.01); *H02K 9/04* (2013.01); *H02K 3/47* (2013.01)

(58) Field of Classification Search
CPC ........ H02K 41/03; H02K 41/031; H02K 5/20; H02K 9/00; H02K 9/02; H02K 9/04; H02K 3/46

USPC ......... 310/12.09, 12.27, 12.29, 52, 58, 60 R, 310/60 A

See application file for complete search history.

(56) References Cited

U.S. PATENT DOCUMENTS

| | | | | |
|---|---|---|---|---|
| 5,753,986 | A * | 5/1998 | Ohtani | H02K 5/136 310/52 |
| 6,977,450 | B2 * | 12/2005 | Asou | B23Q 1/58 310/12.31 |
| 2007/0273219 | A1 * | 11/2007 | Shimada | B23Q 1/70 310/52 |
| 2007/0278864 | A1 * | 12/2007 | Derek Lai | H02K 5/20 310/12.29 |

* cited by examiner

*Primary Examiner* — Tran Nguyen
(74) *Attorney, Agent, or Firm* — Guice Patents PLLC (57) ABSTRACT

A slide-block-type shaft linear motor platform includes a mover and a stator. An air gap is defined between the mover and the stator. The air gap can communicate with outer side via a fluid inlet space. Accordingly, air convection can take place between the heat source, that is, the winding inside the mover and the outer side. Therefore, the heat generated by the winding can be continuously dissipated to prevent the components from deforming due to the heat. In this case, the precision of operation can be ensured and the performance of the motor will not deteriorate due to the heat.

9 Claims, 11 Drawing Sheets

SLIDE-BLOCK-TYPE SHAFT LINEAR MOTOR PLATFORM

BACKGROUND OF THE INVENTION

1. Field of the Invention

The present invention relates generally to a motor, and more particularly to a slide-block-type shaft linear motor platform.

2. Description of the Related Art

A conventional shaft motor generally includes a linearly extending rod-shaped stator as the shaft. A hollow tubular mover is coaxially slidably disposed on the stator. Due to the effect of between the magnetic fields of the mover and the stator, the mover can linearly reciprocally move in the axial direction of the stator to provide a reciprocally driving power for an external object. In common use of the shaft motor, two piers are respectively disposed at two ends of the stator and spaced from each other. Accordingly, the stator is bridged between the two piers to limit the travel of the mover within a range.

When the conventional shaft motor serves as a power source to provide power for a driven object, it is often necessary to guide and locate the driven object. Therefore, in the conventional structure, linear guide rails are often additionally used to guide and locate the driven object in accordance with the industrial requirements.

Figure 1:
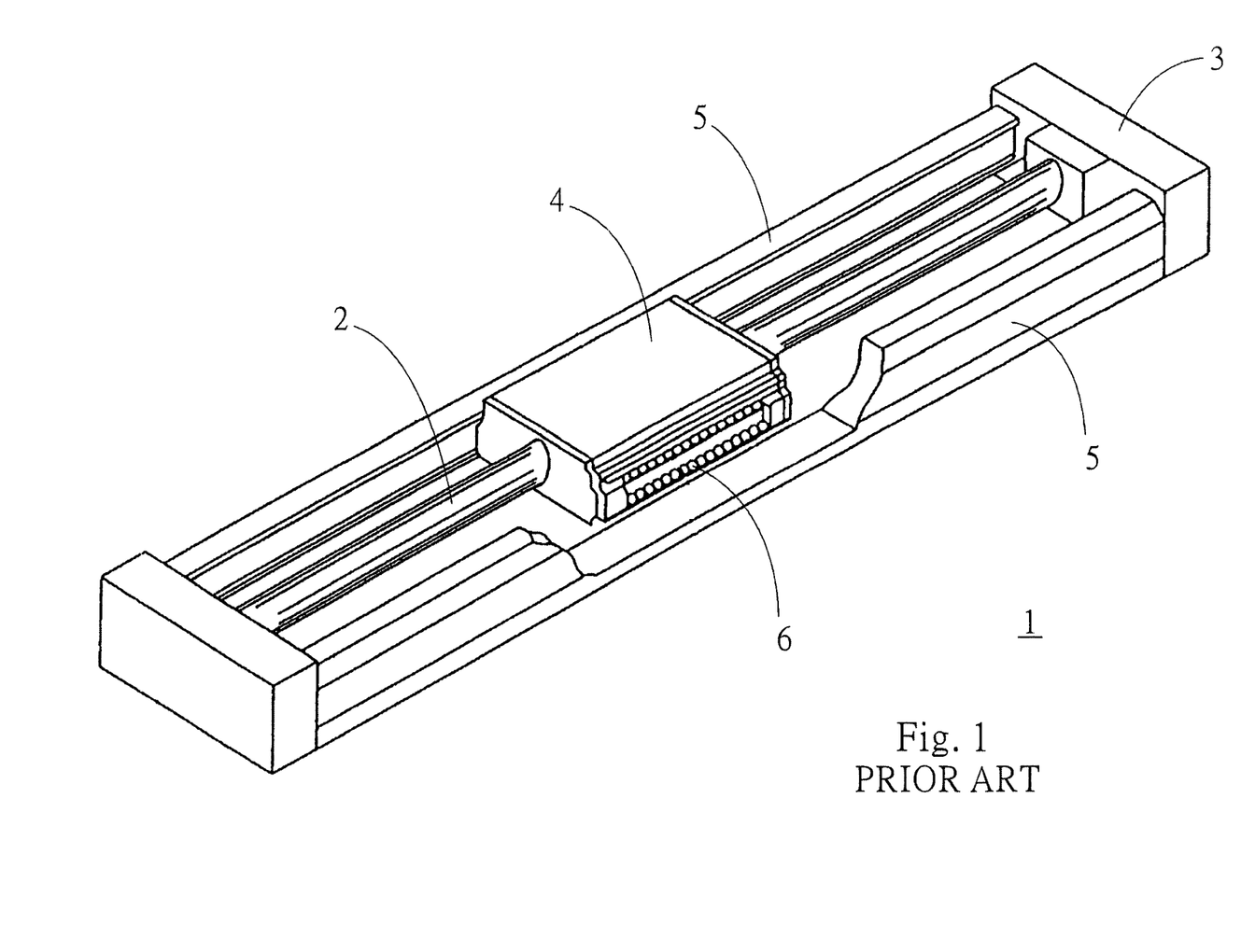
FIG. 1 is a perspective view of a conventional structure.
Figure 2:
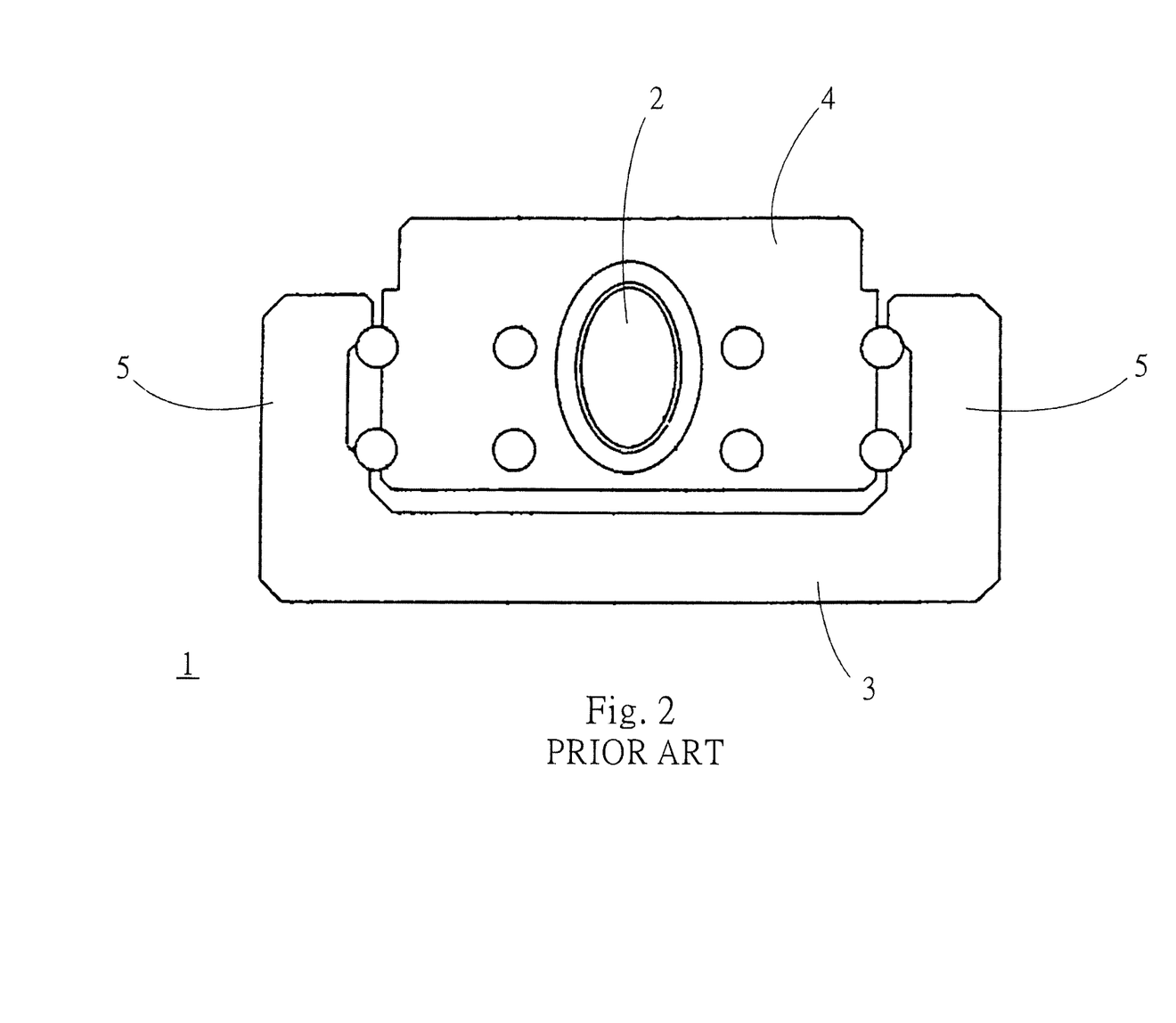
FIG. 2 is a sectional view of the conventional structure.
Figure 3:
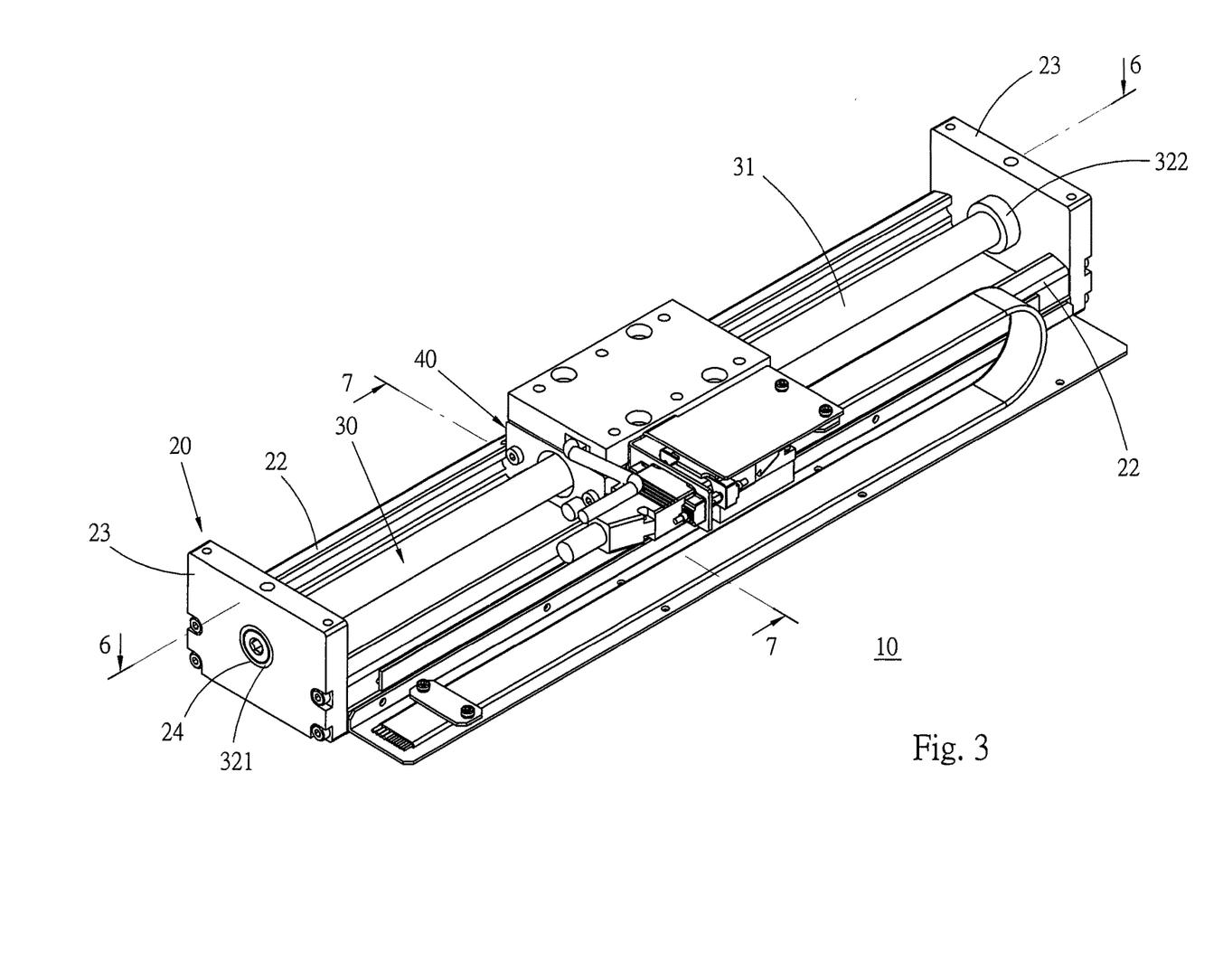
FIG. 3 is a perspective assembled view of a preferred embodiment of the present invention.
Figure 4:
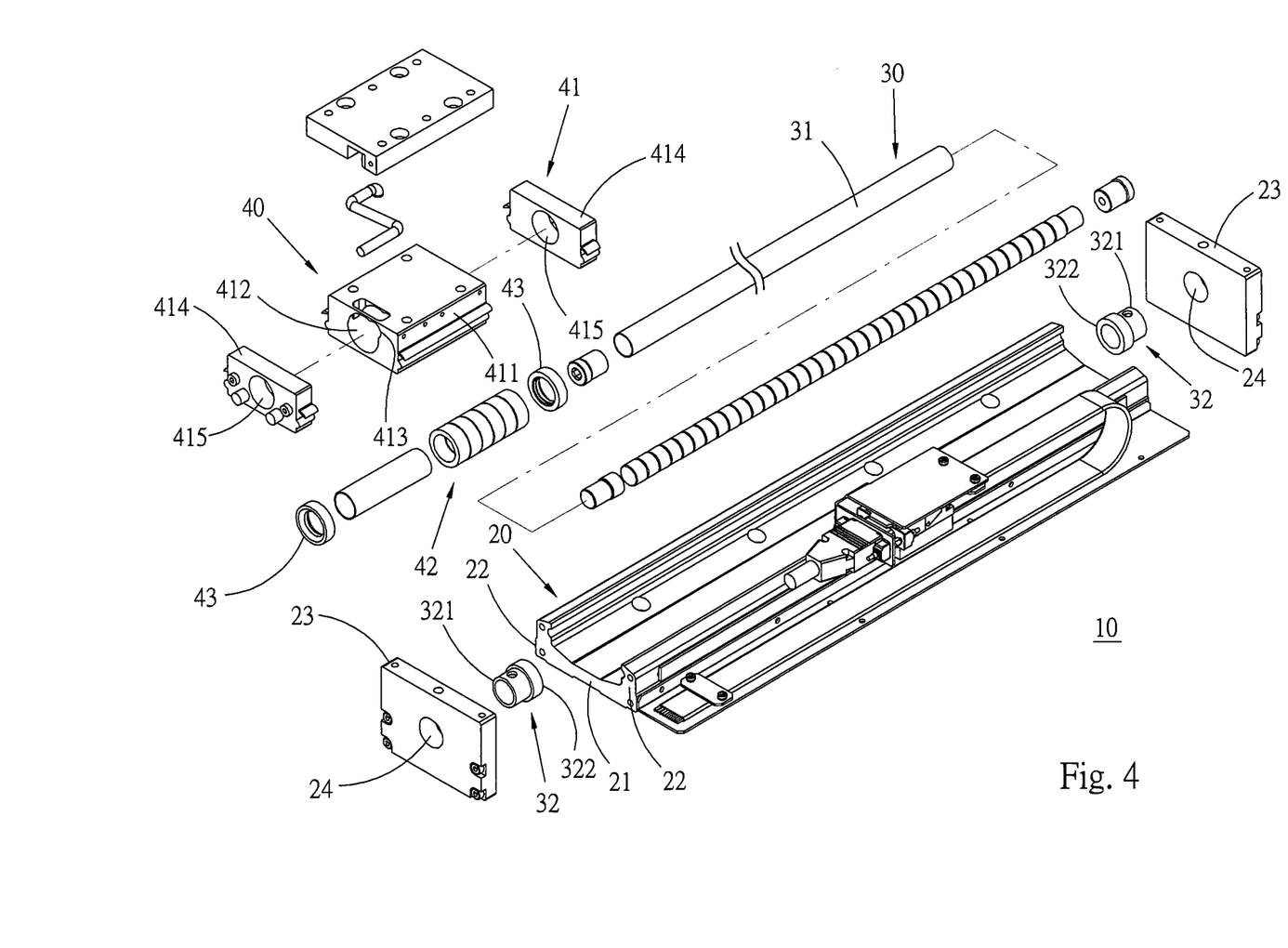
FIG. 4 is a perspective exploded view of the preferred embodiment of the present invention.

In the above conventional technique, the shaft motor and the guide rails are both used to provide power for the driven object and guide the driven object. Therefore, the cost for the apparatus and the cost for the service are increased. To solve this problem, a linear guide device 1 has been developed as shown in FIGS. 1 and 2. According to the linear guide device, a rod-shaped stator 2 is bridged in the case 3. A mover 4 is slidably disposed on the stator 2. U-shaped rail bars 5 are disposed on two sides of the mover 4. The openings of the rail bars 5 face each other. Multiple ball bodies 6 are rollably disposed on two sides of the mover 4 and the inner sides of the openings of the rail bars 5. Accordingly, when the mover 4 reciprocally moves along the stator, the ball bodies 6 rollably contact the rail bars 5 to keep the mover 4 moving in a true direction.

In order to prevent the stator 2 from being curved downward due to gravity or magnetic force, the stator 2 has an elliptic cross section. The long axis of the ellipse is parallel to the direction of gravity. Therefore, the rigidity of the stator 2 is enhanced to lower the possibility of deformation of the stator.

The stator is processed to have an elliptic cross section so as to enhance the mechanical strength of the stator in a specific direction. However, in comparison with the conventional processing method for circular cross section, such processing method is more difficult to perform. Moreover, the enhancement of the mechanical strength of the stator is limited. As a result, the stator still can be hardly applied to a shaft motor with longer travel. Furthermore, although the linear guide device 1 provides an integrated structure of the shaft motor and the linear guide rails, the linear guide device 1 has no solution to negative affection to the linear guide rails due to the heat generated by the motor in operation. Therefore, the application of the linear guide device 1 in industries is not optimal and unreliable.

SUMMARY OF THE INVENTION

It is therefore a primary object of the present invention to provide a slide-block-type shaft linear motor platform in which air convection can take place between the heat source and outer side. Therefore, the heat generated by the heat source can be continuously dissipated to lower the possibility of deformation of the slide block due to the heat. In this case, the precision of operation can be ensured and the performance of the motor will not deteriorate due to the affection of the heat.

To achieve the above and other objects, the slide-block-type shaft linear motor platform of the present invention includes: a base member having two pier sections spaced from each other and two linearly extending guide rails positioned in parallel to each other between the two pier sections and spaced from each other; a stator member having a tubular stator seat, two ends of the stator seat being bridged between the pier sections with an axis of the stator seat in parallel to the length of the guide rails; a mover member having a mover seat slidably disposed on the stator seat and positioned between the guide rails, a tubular winding section being coaxially slidably disposed on the stator seat and received in the mover seat, two ring-shaped end pieces being respectively positioned at two ends of the winding section, two fluid inlet spaces being respectively disposed on the end pieces in communication with an air gap between the winding section and the stator seat; and multiple rolling bodies rollably disposed between the mover seat and the guide rails.

In the above slide-block-type shaft linear motor platform, the fluid inlet space is formed by means of changing the configuration or size of the corresponding components. Substantially, each end piece has an annular body. A tapered outer opening is formed at one end of the annular body. The diameter of the tapered outer opening is gradually increased from inner side to outer side. The outer opening is formed with its back to the winding section, whereby the outer opening forms a part of the fluid inlet space. Alternatively, each end piece has an annular body. At least one recess is formed on inner circumference of the annular body. The recess axially extends between two ends of the annular body, whereby the recess forms the fluid inlet space.

In order to facilitate the assembling process, in the above slide-block-type shaft linear motor platform, the mover seat further includes a hollow main seat body having an interior space. The winding section and the end pieces are received in the interior space. Two end seat bodies are respectively disposed on two sides of the main seat body.

In the above slide-block-type shaft linear motor platform, the end pieces are respectively positioned between the main seat body and the corresponding end seat bodies.

In the above slide-block-type shaft linear motor platform, the mover seat has a main shaft hole passing through the main seat body. A recess is formed on a wall of the main shaft hole and extends along an axis of the main shaft hole.

In the above slide-block-type shaft linear motor platform, the mover seat further has two end shaft holes respectively disposed on the end seat bodies in coaxial communication with the main shaft hole.

In the above slide-block-type shaft linear motor platform, the end shaft holes have a diameter smaller than a diameter of the main shaft hole.

In the above slide-block-type shaft linear motor platform, the end shaft holes respectively correspondingly communicate with the fluid inlet spaces.

In the above slide-block-type shaft linear motor platform, the stator member further includes two elastic support collars respectively fitted on two ends of the stator seat. The elastic support collars serve to provide buffering and shock absorption effect so as to minimize the affection of the impact to the security of the components.

The present invention can be best understood through the following description and accompanying drawings, wherein:

DETAILED DESCRIPTION OF THE PREFERRED EMBODIMENTS

Please refer to FIGS. 3 to 8. According to a preferred embodiment of the present invention, the slide-block-type shaft linear motor platform 10 includes a base member 20, a stator member 30, a mover member 40 and multiple rolling bodies 50.

The base member 20 has an elongated board-shaped bottom section 21 and two linearly extending guide rails 22 protruding from two sides of the bottom section 21 respectively. The guide rails 22 extend in the lengthwise direction of the bottom section 21. The guide rails 22 and the bottom section define therebetween a channeled space. Two board-shaped pier sections 23 are respectively disposed at two ends of the bottom section 21. Inner board faces of the pier sections 23 are securely connected with two ends of the bottom section 21 and the guide rails 22. Two coaxial receiving holes 24 are respectively formed through the pier sections 23. The axis of the receiving holes 24 is parallel to the length of the guide rails 22. The stator member 30 has a stator seat 31 in the form of an elongated tube and two elastic support collars 32 fitted on two ends of the stator seat 31 respectively. Each collar 32 has a stepped outer circumference. The small-diameter end 321 of the collar 32 is coaxially inserted in the corresponding receiving hole 24. Accordingly, the stator seat 31 is indirectly bridged between the pier sections 23. The large-diameter end 322 of the support collar 32 is positioned outside the corresponding receiving hole 24 in abutment with the inner board face of the corresponding pier section 23.

The mover member 40 has a mover seat 41 slidably fitted on the stator seat 31 and reciprocally movable between the two pier sections 23. A substantially tubular winding section 42 is coaxially slidably fitted on the stator seat 31 and received in the mover seat 41. Two ring-shaped end pieces 43 are respectively disposed in the mover seat 41 and positioned at two ends of the winding section 42. Two fluid inlet spaces 44 are respectively disposed on the end pieces 43 in communication with the annular air gap s between the winding section 42 and the stator seat 31.

To speak more specifically, the mover seat 41 further includes a substantially rectangular main seat body 411. A main shaft hole 412 is formed through the main seat body 411 between two ends thereof. The winding section 42 and the end pieces 43 are received in the main shaft hole 412. A recess 413 is formed on a wall of the main shaft hole 412 and extends along the axis of the main shaft hole 412. Two board-shaped end seat bodies 414 are respectively securely connected with two ends of the main seat body 411. Two end shaft holes 415 are respectively formed through the end seat bodies 414 between two end faces thereof in coaxial communication with the main shaft hole 412 and in communication with the fluid inlet spaces 44. The diameter of the end shaft holes 415 is smaller than the diameter of the main shaft hole 412, whereby the end pieces 43 are sandwiched between the end seat bodies 414 and the winding section 42.

Figure 5:
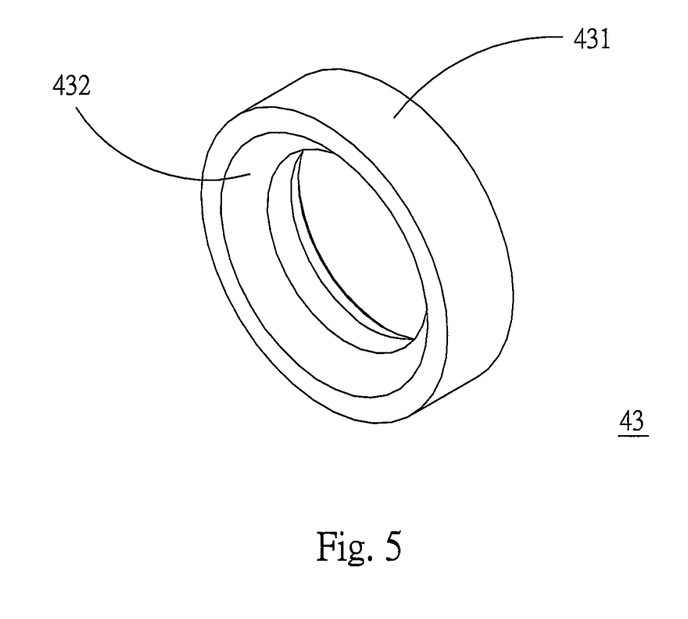
FIG. 5 is a perspective view of the end piece of the preferred embodiment of the present invention.
Figure 6:
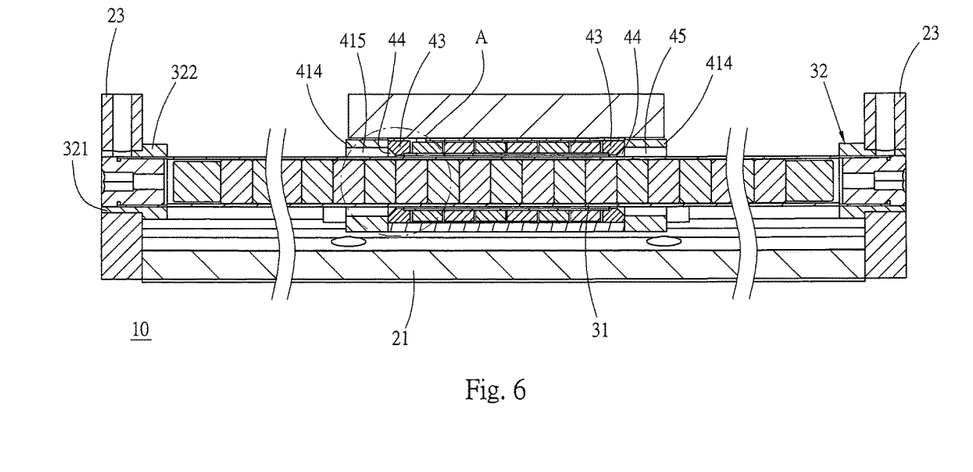
FIG. 6 is a sectional view taken along line 6-6 of FIG. 3.
Figure 8:
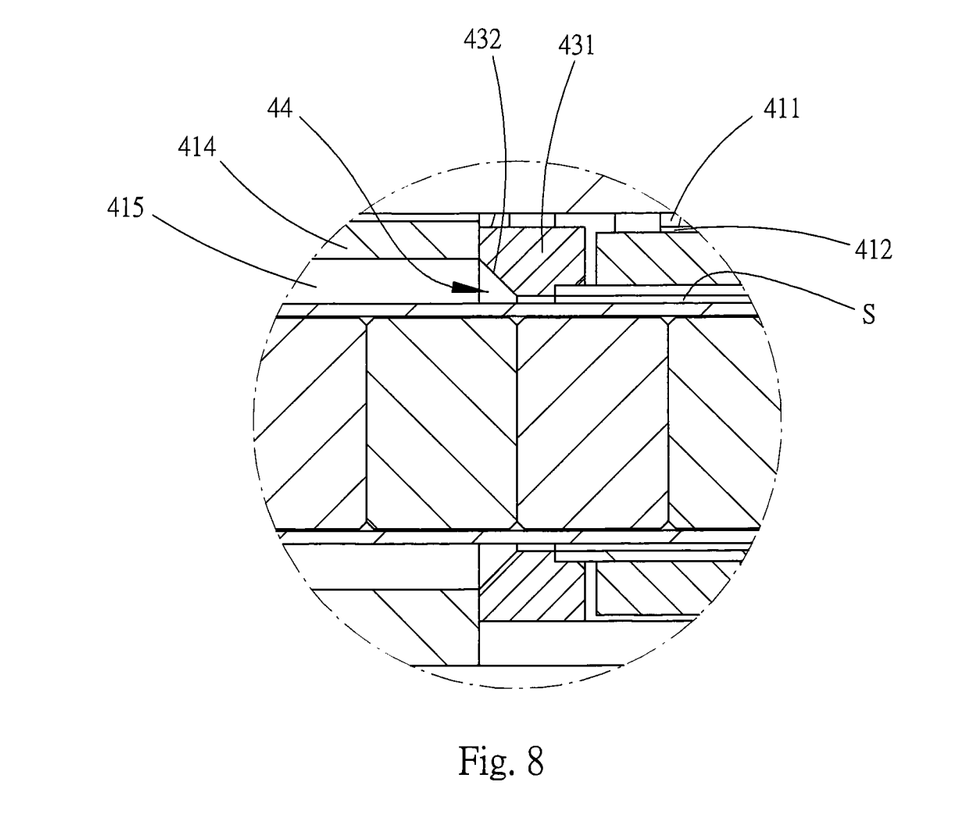
FIG. 8 is an enlarged view of circled area A of FIG. 6.

Furthermore, in this embodiment, the fluid inlet space 44 is formed by means of changing the size of the end pieces 43. To speak more specifically, each end piece 43 has an annular body 431 having a certain thickness and coaxially fitted on the stator seat 31. The annular body 431 is held between the winding section 42 and the corresponding end seat body 414. A tapered outer opening 432 is formed atone end of the annular body 431. The diameter of the tapered outer opening 432 is gradually increased from inner side to outer side. The outer opening 432 communicates with the corresponding end shaft hole 415, whereby the outer opening 432 forms a part of the fluid inlet space 44. The space of the other end of the annular body 431 forms the other part of the fluid inlet space 44. Accordingly, the fluid inlet space 44 serves as an air convection passage between the end shaft holes 415 and the air gap s.

Figure 7:
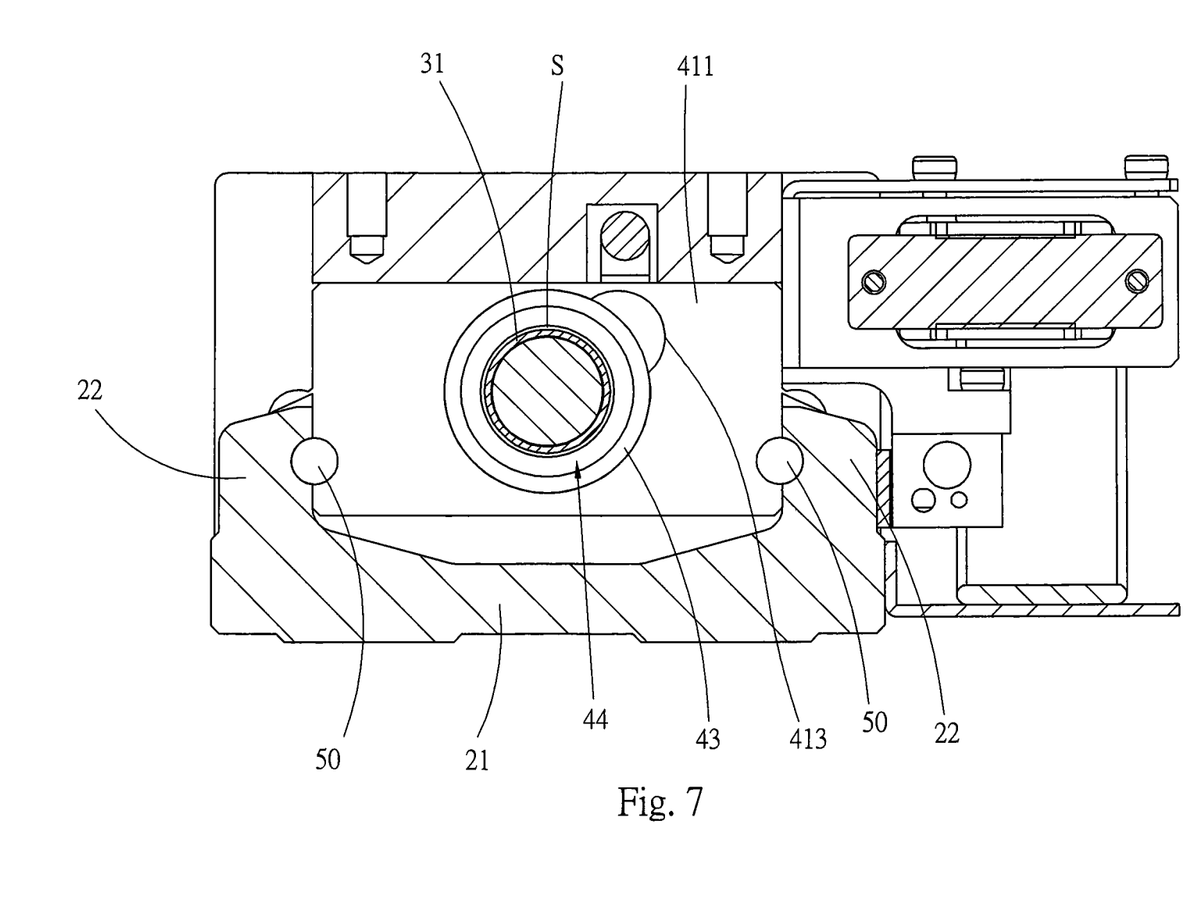
FIG. 7 is a sectional view taken along line 7-7 of FIG. 3.

The rolling bodies 50 are rolling balls rollably disposed between the mover seat 41 and the guide rails 22. Accordingly, by means of the rolling bodies 50, the mover seat 41 can be stably guided by the guide rails 22 and located. The rolling structure is identical to the rolling structure between the slide block and the guide rails of the conventional linear slide rails. In other words, the components of the mover seat 41 are equivalent to the parts of the conventional slide block assembly within a corresponding range.

According to the above arrangement, in use of the slide-block-type shaft linear motor platform 10, under the effect of the magnetic field, the mover member 40 can reciprocally linearly move in the axial direction of the stator seat 31. Moreover, when the mover member 40 moves to the dead end position of the reciprocation travel, the large-diameter ends 322 of the elastic support collars 32 provide buffering effect for the mover member 40, whereby the mover member 40 is prevented from directly impacting the pier sections 23. Therefore, the security of the components can be ensured. Also, the small-diameter ends 321 of the elastic support collars 32 are positioned between the pier sections 23 and two ends of the stator seat 31 so as to provide a shock absorption effect. Therefore, the shock caused by the operation of the slide-block-type shaft linear motor platform 10 can be eliminated.

Besides, when the mover member 40 reciprocally moves along the stator seat 31, by means of the outward diverged fluid inlet space 44, the air can be properly compressed and guided into the air gap s to speed the air convection. Accordingly, the heat generated by the winding section 42 can be continuously dissipated to ensure that the motor operates at high efficiency. Also, the other components can be prevented from deforming due to the heat so as to ensure the precision of operation.

Figure 9:
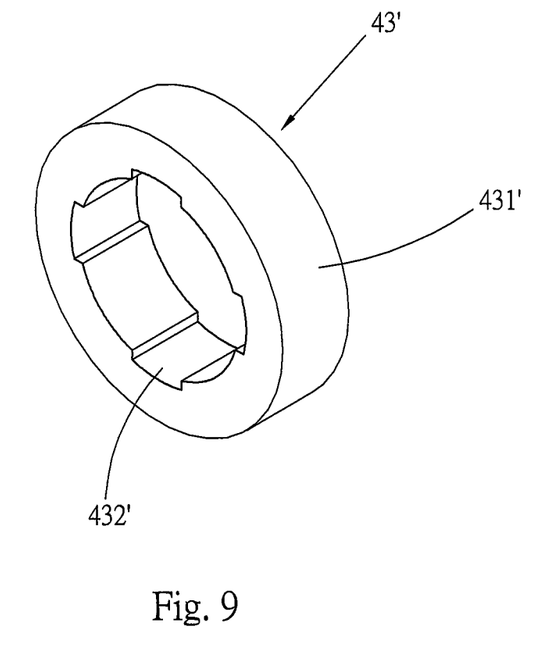
FIG. 9 is a perspective view of the end piece of another embodiment of the present invention.
Figure 10:
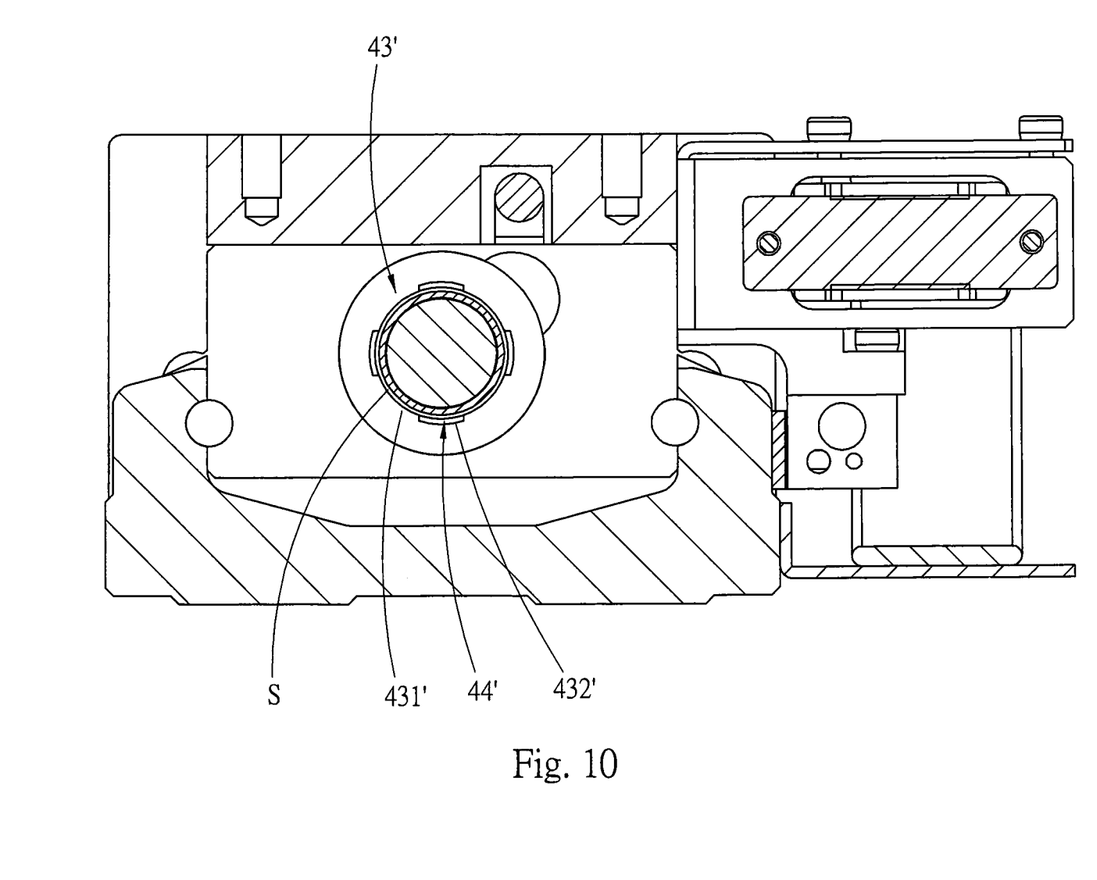
FIG. 10 is a sectional view of the other embodiment of the present invention.
Figure 11:
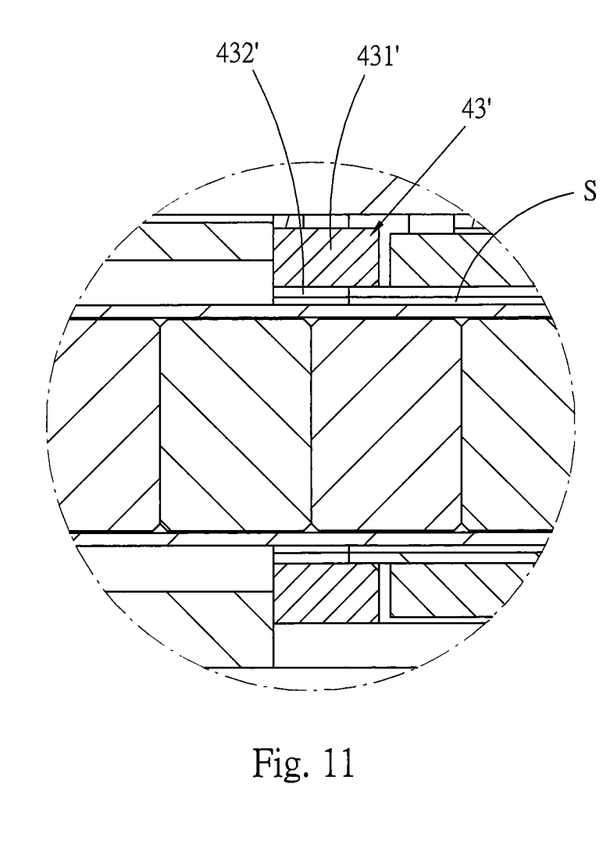
FIG. 11 is an enlarged sectional view of the other embodiment of the present invention.

In addition, it should be noted that the fluid inlet space is formed by means of changing the configuration and size of the end pieces. However, the fluid inlet space can be alternatively formed by other means. For example, as shown in FIGS. 9 to 11, in another embodiment of the present invention, the end piece 43' has an annular body 431' with a certain thickness as the above embodiment. Multiple recesses 432' are formed on inner circumference of the annular body 431'. The recesses 432' axially extend between two ends of the annular body 431'. The recesses 432' serve as the fluid inlet space 44' in communication with the corresponding end shaft holes 414' and the air gap s.

The above embodiments are only used to illustrate the present invention, not intended to limit the scope thereof. Many modifications of the above embodiments can be made without departing from the spirit of the present invention.

What is claimed is:

1. A slide-block shaft linear motor platform comprising:
a base member having two pier sections spaced from each other and two linearly extending guide rails positioned in parallel to each other between the two pier sections and spaced from each other;
a stator member having a tubular stator seat, two ends of the stator seat being bridged between the pier sections with an axis of the stator seat in parallel to a length of the guide rails;
a mover member having a mover seat slidably disposed on the stator seat and positioned between the guide rails, a tubular winding section being coaxially slidably disposed on the stator seat and received in the mover seat, two ring-shaped end pieces being respectively positioned at two ends of the winding section, two fluid inlet spaces being respectively disposed on the two ring-shaped end pieces in communication with an air gap between the winding section and the stator seat; and
multiple rolling bodies rollably disposed between the mover seat and the guide rails;
wherein each end piece of the two ring-shaped end pieces has an annular body, at least one recess being formed on inner circumference of the annular body, the recess axially extending between two ends of the annular body, wherein the recess forms the fluid inlet space.

2. The slide-block shaft linear motor platform as claimed in claim 1, wherein each said end piece of the two ring-shaped end pieces has an annular body, a tapered outer opening being formed at one end of the annular body, a diameter of the tapered outer opening being gradually increased from inner side to outer side, the outer opening being formed with—it's a back located adjacent to the winding section, wherein outer opening forms a part of the fluid inlet space.

3. The slide-block shaft linear motor platform as claimed in claim 1, wherein mover seat further includes a hollow main seat body having an interior space, the winding section and the two ring-shaped end pieces being received in the interior space, two end seat bodies being respectively disposed on two sides of the main seat body.

4. The slide-block shaft linear motor platform as claimed in claim 3, wherein the two ring-shaped end pieces are respectively positioned between the main seat body and the corresponding end seat bodies.

5. The slide-block shaft linear motor platform as claimed in claim 3, wherein the mover seat has a main shaft hole passing through the main seat body, a recess being formed on a wall of the main shaft hole and extending along an axis of the main shaft hole.

6. The slide-block shaft linear motor platform as claimed in claim 5, wherein the mover seat further has two end shaft holes respectively disposed on the end seat bodies in coaxial communication with the main shaft hole.

7. The slide-block shaft linear motor platform as claimed in claim 6, wherein the end shaft holes have a diameter smaller than a diameter of the main shaft hole.

8. The slide-block shaft linear motor platform as claimed in claim 6, wherein the end shaft holes respectively correspondingly communicate with the fluid inlet spaces.

9. The slide-block shaft linear motor platform as claimed in claim 1, wherein the stator member further includes two elastic support collars respectively fitted on two ends of the stator seat.

* * * * *